July 12, 1960     H. M. LANE     2,944,341
DENTAL FORCEPS
Filed June 27, 1958
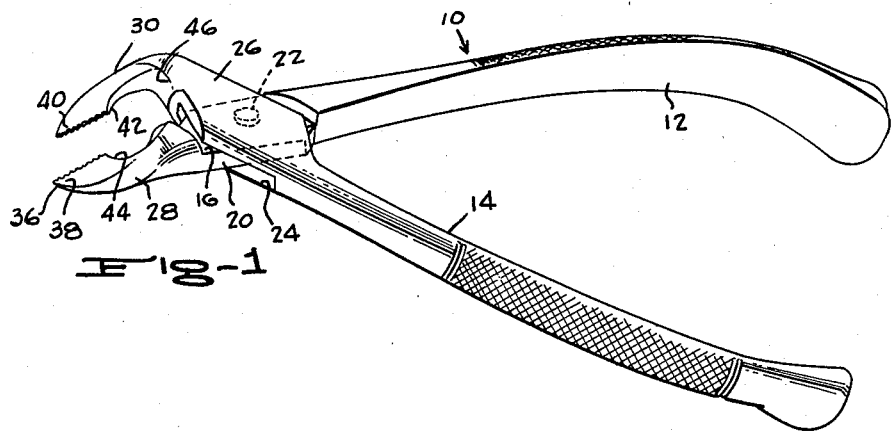
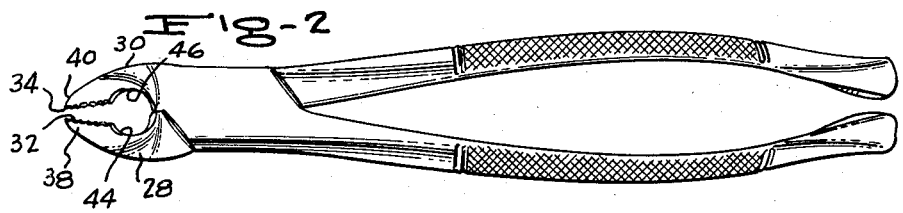
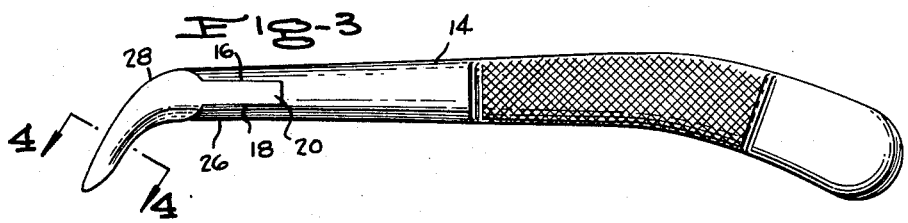
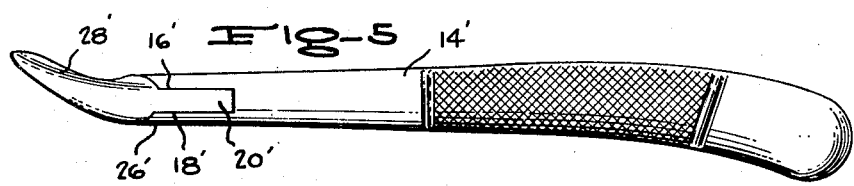
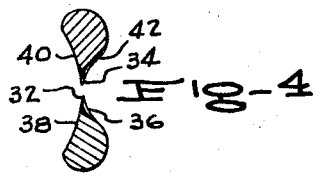
INVENTOR.
HENRY M. LANE
BY
McMorrow, Berman & Davidson
ATTORNEYS

United States Patent Office 2,944,341
Patented July 12, 1960

2,944,341

DENTAL FORCEPS

Henry M. Lane, 33 Main St., Dundee, N.Y.

Filed June 27, 1958, Ser. No. 745,075

5 Claims. (Cl. 32—62)

This invention relates to surgical tools and, more specifically, the instant invention relates to dental surgical tools of the class generally designated as root forceps.

In accordance with modern day practice, most dental surgeons find it expedient to peel back the gum of a patient's jaw and to make an extensive removal of the jaw bone to reach a tooth root for the extraction thereof. This, of course, causes the patient considerable pain, discomfort, and requires suturing, and with forceps presently available, the surgeon must possess not only the required technique for carrying out the operation but must also develop considerable strength in his hands.

Thus, one of the primary objects of this invention is to provide dental forceps especially constructed for the removal and extraction of a tooth root and may be used on a normal, crowned or broken tooth to effect the extraction thereof.

Another object of this invention is to provide dental forceps for the removal of deeply broken roots and to obviate the necessity for drilling and suturing to effect the removal thereof.

A still further object of this invention is to provide for the extraction of a tooth root without suturing or injuring the gum.

This invention contemplates, as a still further object thereof, the provision of dental forceps of the type generally referred to above, the forceps being non-complex in construction and assembly and durable in use.

Other and further objects and advantages of the instant invention will become more evident from a consideration of the following specification when read in conjunction with the annexed drawing, in which:

Figure 1 is a perspective view of an embodiment of dental forceps constructed in accordance with this invention to effect root extraction in the lower jaw;

Figure 2 is a top plan view of the forceps shown in Figure 1;

Figure 3 is a side elevational view of the dental forceps illustrated in Figure 1 showing the forceps in operative position;

Figure 4 is a detail cross-sectional view of the forceps jaws, Figure 4 being taken substantially on the inclined plane of line 4—4 of Figure 3, looking in the direction of the arrows; and, Figure 5 illustrates a second embodiment of this invention especially designed for the root extraction of teeth in the upper jaw.

Referring now more specifically to the drawing, reference numeral 10 designates, in general, dental forceps constructed in accordance with the teachings of this invention especially designed for operation on the lower jaw bone. The forceps 10 is seen to include a pair of substantially concave-convex handle elements 12, 14, these elements having their respective concave sides disposed in confronting relation relative to each other.

The handle element 12 is provided with a pair of opposed recessed or flat sides 16, 18 adjacent one of its ends 20, the end 20 being pivotally secured on a pivot pin 22 within a channel 24 formed at one end 26 of the other handle element 14. The above described construction is conventonal in this art.

The invention to which this specification is specifically addressed resides in the construction of a pair of jaws 28, 30 forming the terminals of the ends 20, 26 of the handle members 12, 14, respectively. The jaws 28, 30 are bowed inwardly towards each other and are bent in the same direction, laterally, with respect to the longitudinal axis of their respective handle elements 12, 14 to establish an angle of substantially 45 degrees relative thereto.

With the forceps 10 in its operative position (Figures 1 to 3, inclusive) it is seen that each of the jaws 28, 30 include confronting adjacent edges having serrated teeth 32, 34 formed at the line of junction of two pairs of angularly inclined curvilinear planes 36, 38 and 40, 42 respectively (see Figure 4) of which the radius of curvature of the curvilinear planes or surfaces 38, 40 is longer than the radius of curvature of the curvilinear planes or surfaces 36, 42. The serrations 32, 34, when the forceps 10 is in its closed position, diverge inwardly and away from each other and end immediately adjacent a pair of arcuate recesses 44, 46 formed in the jaws 28, 30, respectively.

As has been stated above, the embodiment of this invention shown in Figures 1 to 3, inclusive, is designed for dental work on the lower jaw and that species of the invention illustrated in Figure 5 is adapted for similar dental work on the upper jaw. The two embodiments of the invention are identical in construction with but two exceptions, and consequently, similar reference numerals, to which a prime mark has been added, identify corresponding elements. It will be noted that in its operative position as illustrated in Figures 1 to 3, inclusive, the jaws 28, 30 are normally downwardly inclined. In Figure 5, however, with the forceps 10' in operative position, the jaws of the forceps are upwardly inclined. The only other significant and important difference between the two forceps resides in the angularity of the jaws with respect to the longitudinal axis of their respective handle elements. In the latter embodiment, the angularity of the jaws is approximately of the order of 10 degrees.

As has been stated supra, there are no instruments presently available that will engage the tooth root through the bone, and present methods of extraction require extensive removal of the jaw bone and gum flap to reach a broken root. The upper and lower jaw forceps constructed as illustrated and described herein allows a positive grip to be secured on a broken root and extraction thereof is obtained without extensive injury to the gum or suturing. For example, on a broken tooth, the jaw bone may be drilled at one point on each side of the tooth, and then the jaws 28, 30 inserted to accomplish an easy extraction. The recesses 44, 46 permit the forceps to fit around a crowned or normal tooth without interference therewith, and the curvilinear sides 36, 38, 40 and 42 permit the forceps to be used without undue interference from adjoining teeth.

Having described and illustrated two embodiments of this invention in detail, it is to be understood that the same are offered merely by way of example, and that the instant invention is to be limited only by the scope of the appended claims.

What is claimed is:

1. Dental forceps comprising a pair of handle members pivotally connected together adjacent one of their respective ends in crossed relation relative to each other, each of said ends comprising a jaw laterally offset with respect to their respective handle and having their respective longitudinal axes inclined at an acute angle with respect to the longitudinal axis of their respective associated handle, each of said ends having opposed concave sides formed by a pair of curvilinear planes intersecting to form an edge, an each of said edges being disposed in confronting relation relative to each other and having a plurality of serrations formed therein.

2. Dental forceps as defined in claim 1, and said serrated edges diverging inwardly from each other towards said pivotal connection.

3. Dental forceps as defined in claim 1, and each of said jaws having an arcuate recess formed therein intermediate the inner end of its respective serrated edge and said pivotal connection, said recesses being disposed in confronting relation relative to each other.

4. Dental forceps or defined in claim 3, wherein said jaws and serrated edges extend at an angle of substantially 45 degrees relative to the longitudinal axis of said handles.

5. Dental forceps as defined in claim 3, wherein said jaws and serrated edges extend at an angle of substantially 10 degrees with respect to the longitudinal axis of said handles.

References Cited in the file of this patent

UNITED STATES PATENTS

| | | |
|---|---|---|
| 649,742 | Mories | May 15, 1900 |
| 713,470 | Martin | Nov. 11, 1902 |
| 2,504,227 | Rubba | Apr. 18, 1950 |